United States Patent [19]

Small

[11] Patent Number: 5,255,925

[45] Date of Patent: *Oct. 26, 1993

[54] TELEPHONE SPELLING GAME METHOD

[76] Inventor: Maynard E. Small, 105 Ward Pkwy., Apt. 507, Kansas City, Mo. 64112

[*] Notice: The portion of the term of this patent subsequent to Jul. 28, 2009 has been disclaimed.

[21] Appl. No.: 912,290

[22] Filed: Jul. 13, 1992

Related U.S. Application Data

[63] Continuation-in-part of Ser. No. 576,660, Aug. 31, 1990, Pat. No. 5,133,560.

[51] Int. Cl.⁵ .............................................. A63F 9/22
[52] U.S. Cl. .................................... 273/439; 273/272; 434/167; 434/169
[58] Field of Search .................... 273/237, 272, 439; 434/167, 169; 379/88, 90, 92, 93, 95, 97

[56] References Cited

U.S. PATENT DOCUMENTS

| | | | |
|---|---|---|---|
| 4,189,779 | 2/1980 | Brautingham | 273/237 |
| 4,320,256 | 3/1982 | Freeman | 434/321 |
| 4,372,558 | 2/1983 | Shimamoto et al. | 273/237 |
| 4,539,435 | 9/1985 | Eckmann | 434/307 |
| 4,570,930 | 2/1986 | Matheson | 273/439 |
| 4,592,546 | 6/1986 | Fascenda et al. | 273/439 |
| 4,649,563 | 3/1987 | Riskin | 379/88 |
| 4,749,353 | 6/1988 | Breedlove | 434/169 |
| 4,792,968 | 12/1988 | Katz | 379/92 |
| 4,817,129 | 3/1989 | Riskin | 379/88 |
| 4,827,500 | 5/1989 | Binkerd et al. | 379/88 |
| 4,845,739 | 7/1989 | Katz | 379/92 |
| 4,926,255 | 5/1990 | Von Kohorn | 434/323 |
| 5,133,560 | 7/1992 | Small | 273/439 |

OTHER PUBLICATIONS

Human Factors, 1971, 13(2) pp. 1890190; article by Sidney L. Smith and Nancy C. Goodwin entitled Alphabetic Data Entry Via The Touch-Tone Pad: A Comment.

Scripps Howard; What this Book is: directed to the National Spelling Bee; 1990 Words of the Champions.

Pre-School; No. 231, Spell-It by Cadaco.

Spell It Plus by Davidson & Associates, Inc.

Washington Post, Washington Business/Sep. 23 (Von Meister) article; cited from 379-397.

Primary Examiner—Jessica J. Harrison
Attorney, Agent, or Firm—Litman, McMahon & Brown

[57] ABSTRACT

Apparatus and method for playing a spelling game, wherein a player enters a telephone number to obtain access to a specially programmed audiotex voice communication device which enables the user to interact with the device by attempting to spell a sequence of words which are automatically pronounced for the player. Spelling is accomplished by player responses which are stored and reviewed by the audiotex device which determines whether the player has met predetermined criteria to be a game winner. Such criteria is preferably a combination of correct words spelled in less than a predetermined time period.

15 Claims, 1 Drawing Sheet

TELEPHONE SPELLING GAME METHOD

RELATED APPLICATION

This application is a Continuation-in-Part of U.S. application Ser. No. 07/576,660 filed Aug. 13, 1990, now U.S. Pat. No. 5,133,560.

INTRODUCTION

The present invention relates generally to the application of programmed computer systems and more particularly to a method for playing a game, wherein a player accesses, through a common telephone, an interactive audiotex voice communication device enabling the player to send and receive information in a predetermined sequence and under predetermined controls.

DESCRIPTION OF THE PRIOR ART

It is known to access computer-stored data through a telephonic communications network. In one form, information is obtained by employing a common telephone touch pad, creating alpha or alpha-numeric signal sequences which trigger the transmission of a request for information to a remotely located data base, a synthesized voice signal being used to carry the information requested back to the telephone user. The arrangement allowing this activity is often termed an audiotex voice communication device. The present invention utilizes the basic structure of such audiotex voice communication devices, however, in a novel arrangement which allows the caller to play a game.

SUMMARY OF THE INVENTION

This invention contemplates a method for playing a game, and in its preferred form a spelling game, wherein a player enters a telephone number, and, if required, credit information, to obtain access to a specifically programmed audiotex interactive voice communication device. The audiotex device enables the user to interact with the device by attempting to correctly spell, within a predetermined time period, a predetermined number of words which are automatically pronounced or defined for the player. In one form, the results are tallied and reported to the player by the audiotex device at the conclusion of the game. In an "instant winner" form, the player is immediately notified at the conclusion of the game whether a prize has been won.

BRIEF DESCRIPTION OF THE DRAWINGS

While the invention is particularly pointed out and distinctly claimed in the concluding portions herein, a preferred embodiment and variations are set forth in the following detailed description which may best be understood when read in connection with the accompanying drawings in which:

DETAILED DESCRIPTION OF THE PREFERRED EMBODIMENT

Figure 1:
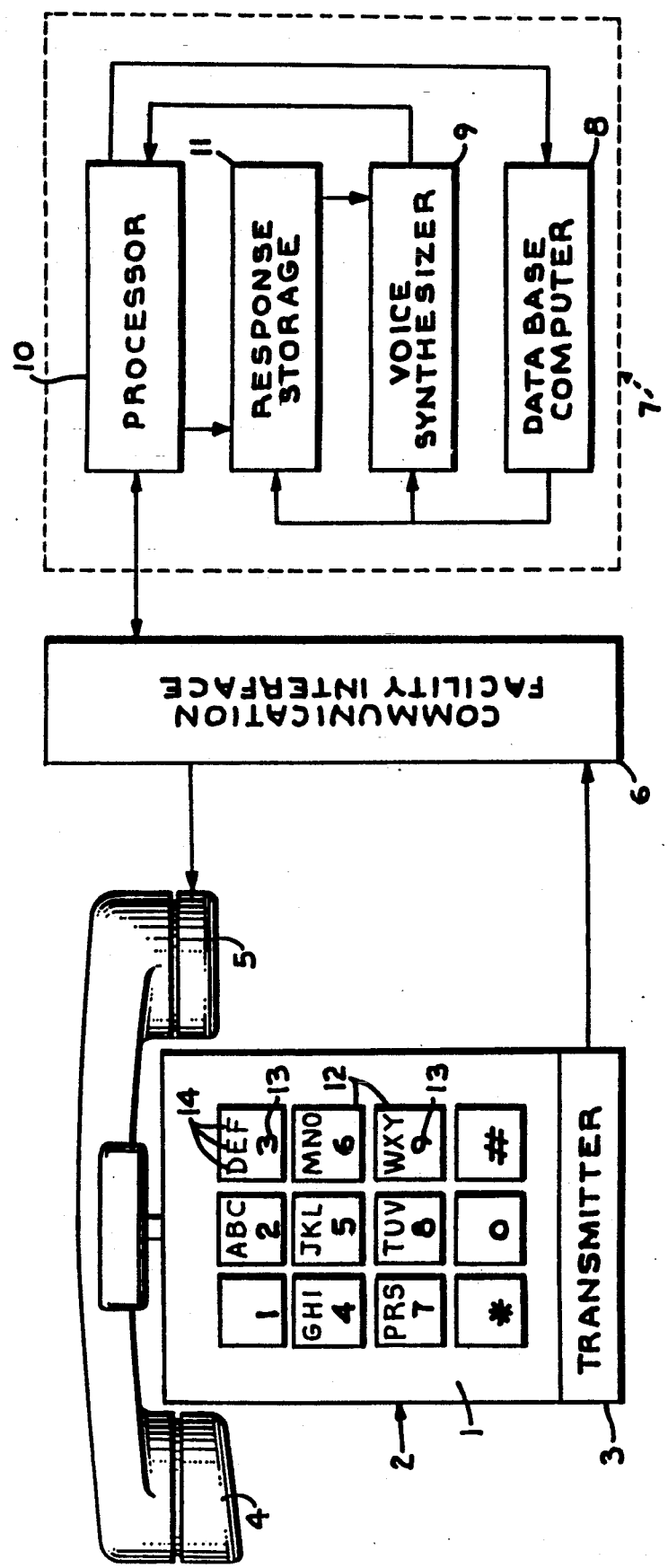
FIG. 1 is a partial block diagram schematically showing a relationship between a common telephone interfaced with an interactive audiotex voice communication device arranged for enabling the user to play a spelling game.

Referring to FIG. 1, the reference numeral 1 designates multiple signal input means in the form of a conventional key pad 1 of a schematically illustrated, common telephone 2. The telephone 2 includes a sound signal transmitter 3 associated with a microphone or mouthpiece 4 and an earpiece or receiver 5 which converts controlled electronic signals to voice language sound for reception by the user.

An appropriate communication facility interface 6, for example, a PBX (private branch exchange) or an ACD (automatic call distributor) or other type of commonly used switching unit, is functionally positioned in the usual manner to relay signals to and from the telephone 2.

The interface 6 is, in turn, functionally connected to a schematically illustrated, normally remote, audiotex device 7. The audiotex device 7 is preferably of the type known as a "large-line, interactive system", designed to support a plurality of simultaneous functions, including answering multiple incoming telephone calls and multiple caller prompting. The prompting function invites caller interaction with predetermined and recorded data by urging the caller, in one form of this invention, to press signal producing keys, forming the active portion of the telephone key pad 1. In another form, the voice response of the player is received as the signal.

More particularly, the audiotex device 7 is adapted to respond to appropriate key produced signals or voice signals by issuing digitized information which is transformed into audio message signals through a data base computer 8 cooperating with a voice synthesizer 9. Control of the audiotex device 7 is maintained through a processor 10 which communicates with a response storage unit 11. The unit 11 stores signals constituting the responses of the caller to the prompting, as well as the time taken by the caller in providing certain responses. The voice synthesizer 9 converts data base stored signals to signals which, at the receiver 5, become easily recognizable audio words to the caller.

The telephone 2, in one form of this invention, is the well known dual tone, multi-frequency type having twelve keys 12, eight of which are respectively associated with a single number digit 13 and three alphabet letters 14. The remaining keys are sometimes referred to as "special function" keys, but are capable of producing similar signals, although at different, dedicated frequencies.

In practicing the invention, a caller enters a telephone number in the usual manner by sequentially pressing selected keys 12, thereby accessing and triggering the audiotex device 7 to deliver a first predetermined synthesized voice message to the caller. Typically, the first voice message includes an offer to initiate a spelling game with instructions for the player to indicate, by pressing a designated key or by voice response, a desire to play and receive gaming data, in this example, in the form of the first word of a sequence of words to spell.

If the caller (player) elects to enter the signal in accordance with the instructions, the audiotex device 7 responds by selecting the first word (randomly or in a predetermined order) from a recorded bank of words, and transmit same by synthesized voice to the receiver 5, where it becomes intelligible sound to the player.

Within a measured time limit, the player, in one form of this invention, attempts to spell the word by entering a sequence of dial pad key signals through pressing selected keys of the multiple key pad 1. As noted above, specific dial pad keys are associated with particular letters of the alphabet and the player presses the keys corresponding to what the player believes to be the letters and sequence thereof needed to correctly spell the first word. For example, assuming that the first word is "cat", the player presses the key associated with "c", then presses the same key again, since that key is also associated with the letter "a", and subsequently presses the key associated with the letter "t". The data base computer 8, in this case receiving tone signals generated by the keys numbered 2 and 8, will recognize the sequence of signals 2-2-8 as correctly spelling "cat". Also, the time taken for entering the sequence will be measured and stored.

In another form the player spells, by conventional voice response, the perceived individual letters in the perceived proper sequence. The data base computer 8, in this case, utilizes voice recognition technology to determine whether the spelling is correct. In this form also the time taken will be measured and stored.

After the player completes the spelling of the word, the player so indicates by entering a signal, such as by pressing a particular key on the dial pad, for example, the pound (#) or star (*) key, which signals the device to cease measuring time taken to spell the word. In one embodiment, the timing begins at the beginning of the speaking of the word to be spelled and ends when the player enters the "word end" signal. The completion signal also triggers the audiotex device to provide the player with a second voice word through the telephone receiver 5. The foregoing exchange between the audiotex device 7 and the player is repeated for a predetermined plurality of words, after which the audiotex device informs the player, through words produced by input to the voice synthesizer and before disconnect, of the player's "score", which may include the number of words correctly or incorrectly spelled among the total number of words supplied and, if appropriate, the combined total time taken to spell the correct group and whether a prize has been won.

The words to be spelled may be generated by the audiotex device in a particular sequence or randomly selected under predetermined criteria from the data base within the data base computer. Further, the audiotex unit may be programmed to limit the number of times or games in which each player may participate during a particular time period in order to prevent abuse. Prizes of various values may be announced for achieving scores, using more or less difficult words and/or the arrangement may be particularly adapted for teaching purposes, rather than utilizing a contest format.

Note that for words containing the letter "q" or "z", which are sometimes not found on standard telephone key pads, the signal created by the key identified with the numeral "0" or "1" may conveniently constitute the "q" and/or "z" signal recognizable by the audiotex unit.

Selected keys, such as "*", "0", "1" or "#" on standard key pads may be used to provide other features, such as a request for the audiotex unit to repeat the pronunciation of a word, adjust volume, request a "live" operator, etc.

In one form of the invention, the audiotex device is programmed to produce intermediate voice messages. For example, after completion of spelling the next-to-last word and before providing the final word to be spelled, an announcement may be made that the next word is the final word. This tends to further enhance the competitive feeling usually desired in game playing.

It may be desirable that the audiotex unit be programmed to keep track of various individual players by requesting a telephone number, social security number or preassigned identification number of the player. In the alternative, such identifying number may be requested when identification is necessary to qualify for playing the game or because a prize has been won. In any case, the identifying number may be entered in the same manner as entering a usual telephone number, that is, by pressing telephone pad keys in sequence, or by voice signal recognition.

It may be desirable to program the audiotex unit to record and, upon request, repeat to the player each word misspelled during a game.

While particular embodiments of this invention have been shown and/or described, it will be apparent that many changes may be made in the form, arrangement, positioning and use of the various elements. In consideration thereof, it should be understood that preferred embodiments of this invention are intended to be illustrative only and not intended to limit the scope of the invention.

What is claimed and desired to be secured by Letters Patent is as follows:

1. A method for conducting a spelling game wherein a player uses a common telephone, comprising the steps of:
   (a) recording a bank of words to be spelled into a data base;
   (b) programming an interactive audiotex voice communication device, which includes response storage and a processor, to respond to signals produced by the player, said response to the player signals including the delivery of synthesized voice messages through said telephone to the player, said voice messages including a first word of a plurality of words selected from said data base for the player to spell;
   (c) programming said audiotex device to receive and store a sequence of signals produced by the player which are associated with letters of the alphabet in an attempt by the player to correctly spell said first word;
   (d) programming said audiotex device to recognize said letter signal sequence as corresponding to the correct spelling of said first word and to measure the time taken for the player to enter said signal sequence;
   (e) programming said audiotex device to provide the player by synthesized voice with another word to spell;
   (f) programming said audiotex device to repeat the foregoing selection, transmission, reception, recognition and measurement steps for a predetermined plurality of words selected from said data base; and
   (g) programming said audiotex device to determine, following the last word of said plurality of words, whether the player has met predetermined criteria to be a game winner.

2. The method as set forth in claim 1 wherein:
   (a) said criteria is a combination of spelling correctness and time taken to spell.

3. The method as set forth in claim 2 including the step of:
   (a) programming said audiotex device to measure said time from the beginning of the speaking of the word to be spelled to the entry by the player of a signal that the spelling of the work has been completed.

4. The method as set forth in claim 1 wherein:

(a) said signals produced by the player are voice signals and said audiotex device includes voice signal recognition equipment.

5. The method as set forth in claim 1 wherein:
(a) said signals produced by the player are produced by pressing selected keys on a key pad telephone.

6. The method as set forth in claim 5 including the step of:
(a) programming said audiotex device to recognize a letter not found on any of said dial pad keys by a signal generated by a key not identified by a letter.

7. The method as set forth in claim 1 including:
(a) the step of programming said audiotex device to notify the player immediately following completion of the game as to whether the player is a prize winner.

8. The method as set forth in claim 1 including the step of:
(a) programming said audiotex device to limit the number of said games that the player is permitted to play during a predetermined time period.

9. The method as set forth in claim 1 including the step of:
(a) programming said audiotex device to selected said plurality of words in a sequence according to predetermined spelling difficulty criteria.

10. The method as set forth in claim 1 including the step of:
(a) programming said audiotex device to repeat a word to be spelled in response to the entry of a signal by the player.

11. The method as set forth in claim 1 including the step of:
(a) programming said audiotex device to produce at least one intermediate voice message between words to be spelled.

12. The method as set forth in claim 1 including the step of: (a) programming said audiotex device to produce a voice message after completion of the next-to-last word to be spelled and before the final word to be spelled.

13. The method as set forth in claim 1 including the step of:
(a) programming said audiotex device to determine each word which has been misspelled during the game and repeat the misspelled words to the player upon player request.

14. The method as set forth in claim 1 including the step of:
(a) programming said audiotex device to require the entry by the player of signals identifying the player before providing the player with words to be spelled.

15. A method for conducting a spelling game wherein a player uses a common telephone, comprising the steps of:
(a) recording a bank of words to be spelled into a data base;
(b) programming an interactive audiotex voice communication device, which includes response storage and a processor, to respond to signals produced by the player, said response to the player signals including the delivery of synthesized voice messages through said telephone to the player, said voice messages including a first word of a plurality of words selected from said data base for the player to spell;
(c) programming said audiotex device to receive and store a sequence of signals produced by the player which are associated with letters of the alphabet in an attempt by the player to correctly spell said first word;
(d) programming said audiotex device to recognize said letter signal sequence as corresponding to the correct spelling of said first word and to provide the player by synthesized voice with another word to spell;
(e) programming said audiotex device to repeat the foregoing selection, transmission, reception and recognition steps for a predetermined plurality of words selected from said data base; and
(f) programming said audiotex device to measure the time taken to receive and spell words and provide a synthesized voice message to the player through said telephone following the last word of said plurality of words and before telephone disconnect, informing the player whether a prize has been won according to predetermined criteria of spelling correctness and time taken to spell.

* * * * *